(12) United States Patent
Rachlin

(10) Patent No.: US 8,311,697 B2
(45) Date of Patent: Nov. 13, 2012

(54) IMPACT ASSESSMENT SYSTEM AND METHOD FOR DETERMINING EMERGENT CRITICALITY

(75) Inventor: Elliott H. Rachlin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 2036 days.

(21) Appl. No.: 10/901,385

(22) Filed: Jul. 27, 2004

(65) Prior Publication Data

US 2006/0025908 A1 Feb. 2, 2006

(51) Int. Cl.
*G01C 22/00* (2006.01)
*G01M 27/00* (2006.01)
(52) U.S. Cl. .................................. 701/29.1; 701/34.1
(58) Field of Classification Search ............ 701/29, 701/34; 702/182, 184, 185; 714/798
See application file for complete search history.

(56) References Cited

U.S. PATENT DOCUMENTS

| | | | | |
|---|---|---|---|---|
| 4,964,126 | A * | 10/1990 | Musicus et al. | 714/797 |
| 5,014,220 | A * | 5/1991 | McMann et al. | 706/45 |
| 5,034,686 | A * | 7/1991 | Aspelin | 324/537 |
| 5,544,308 | A | 8/1996 | Giordano et al. | |
| 5,671,141 | A * | 9/1997 | Smith et al. | 701/33.6 |
| 5,881,971 | A * | 3/1999 | Hickman | 244/1 R |
| 6,208,955 | B1 * | 3/2001 | Provan et al. | 703/20 |
| 6,350,239 | B1 * | 2/2002 | Ohad et al. | 600/437 |
| 6,434,512 | B1 * | 8/2002 | Discenzo | 702/184 |
| 6,636,786 | B2 * | 10/2003 | Partel | 701/3 |
| 6,662,089 | B2 * | 12/2003 | Felke et al. | 701/29.3 |
| 6,928,345 | B2 * | 8/2005 | Quinn | 701/29 |
| 7,043,348 | B2 * | 5/2006 | Uluyol et al. | 701/100 |
| 7,243,048 | B2 * | 7/2007 | Foslien et al. | 702/185 |
| 7,244,231 | B2 * | 7/2007 | Dewing et al. | 600/300 |
| 7,337,086 | B2 * | 2/2008 | Guralnik et al. | 702/113 |
| 7,369,932 | B2 * | 5/2008 | Kim et al. | 701/100 |
| 7,412,291 | B2 * | 8/2008 | Judd et al. | 700/21 |
| 2002/0138230 | A1 * | 9/2002 | Faymon et al. | 702/145 |
| 2002/0150068 | A1 * | 10/2002 | Orr et al. | 370/335 |
| 2002/0188582 | A1 * | 12/2002 | Jannarone et al. | 706/26 |
| 2002/0193920 | A1 * | 12/2002 | Miller et al. | 701/29 |
| 2003/0025515 | A1 * | 2/2003 | Mulera et al. | 324/713 |
| 2003/0114965 | A1 * | 6/2003 | Fiechter et al. | 701/29 |
| 2003/0188221 | A1 * | 10/2003 | Rasmussen et al. | 714/11 |
| 2003/0229471 | A1 * | 12/2003 | Guralnik et al. | 702/182 |

(Continued)

OTHER PUBLICATIONS

PCT International Search Report: PCT/US2005/025429, Oct. 31, 2005, EP International Search Authority, 7 pages.

(Continued)

*Primary Examiner* — Ian Jen
(74) *Attorney, Agent, or Firm* — Ingrassia Fisher & Lorenz, P.C.

(57) ABSTRACT

An impact assessment system and method for determining emerging criticality in a complex system is provided. The impact assessment system includes a component dependency model and an emergent criticality analyzer. The component dependency model describes the relationships between components in the system and their underlying dependency and criticality relationships. The impact assessment system receives component failure data from the complex system and uses the component dependency model and emergent criticality analyzer to determine the impact of the component failure on the criticality of remaining components in the system. The impact assessment system is thus able to determine how component failures in the complex system can impact the criticality of remaining components in the complex system and thus can assist in determining how those components may or may not be safely used in further operational activities.

24 Claims, 12 Drawing Sheets

U.S. PATENT DOCUMENTS

| | | | | |
|---|---|---|---|---|
| 2004/0176885 | A1 | 9/2004 | Quinn | |
| 2005/0209767 | A1* | 9/2005 | Kim et al. | 701/100 |
| 2006/0195248 | A1* | 8/2006 | Kim et al. | 701/100 |
| 2006/0235599 | A1* | 10/2006 | Mukherjee et al. | 701/100 |
| 2007/0005527 | A1* | 1/2007 | Parthasarathy | 706/15 |
| 2007/0124113 | A1* | 5/2007 | Foslien et al. | 702/185 |
| 2007/0288409 | A1* | 12/2007 | Mukherjee et al. | 706/25 |
| 2008/0103645 | A1* | 5/2008 | DeMers et al. | 701/14 |
| 2008/0249680 | A1* | 10/2008 | Dwyer et al. | 701/35 |
| 2008/0262729 | A1* | 10/2008 | Bacon et al. | 701/220 |
| 2008/0266120 | A1* | 10/2008 | Leeland et al. | 340/578 |

OTHER PUBLICATIONS

P. Wang and G. Vachtsevanos, "Fault Prognosis Using Dynamic Wavelet Neural Networks, School of Electrical and Computer Engineering", Georgia Institute of Technology, Atlanta, GA.

A. Donati, Special Projects Division, ESA Directorate of Technical and Operational Support, ESOC, Darmstadt, Germany and E. Romani, Dataspazio, Rome, Italy "INTELMOD—An Intelligent System for Capturing Operations Knowledge and Providing Advanced Operations Support".

Fredrik Dahlstrand, "Consequence Analysis Theory for Alarm Analysis", Department of Information Technology, Lund University, Sweden.

Phillip A. Porras, Martin W. Fong and Alfonso Valdes, "A Mission-Impact-Based Approach to INFOSEC Alarm Correlation", SRI International, Menlo Park, CA.

Enrico Romani and Mark Aynsley, "Knowledge Base System Technology Applied to Mission Control—Final Report Executive Summary", Dataspazio s.p.a., Science Systems, Mar. 24, 2000, Roma, Italia.

* cited by examiner

```
BOX: IMU 2 (6)
  COMPUTE_ORDER: 75
  INPUT_#1: IMU Cooling (49)
  INPUT_#2: IMU 2 POWER (8)
  INPUT_#3: FF 2 MDM (44)
  WEIGHT_#1: 1
  WEIGHT_#2: 1
  WEIGHT_#3: 1
  OUTPUT_FUNCTION: IN_RANGE
  OUTPUT_PARAM_#1: 3
  OUTPUT_PARAM_#2: 3
  ANNUNCIATOR: IN_RANGE
  ANNUNCIATOR_PARAM_#1: 0
  ANNUNCIATOR_PARAM_#2: 0
  ANNUNCIATOR_IMPORTANCE: 42
  REPORT: IMU 2 LOST
  TELEMETRY: TM040
  TELEMETRY_GOOD_ENUM: 1
  REAL_EQUIPMENT: YES
ENDBOX: 75
```

Diagnosed as failed: FUEL CELL # 1, CNT AB2 <mode is 1>
Effect: 49 MAIN A UNPOWERED (equipment)
Effect: 48 FPC 1 UNPOWERED (equipment)
Effect: 47 AC 1 UNPOWERED (equipment)
Effect: 46 IMU FAN A LOST (equipment)
Effect: 44 IMU 1 RPC A LOST (equipment)
Effect: 44 IMU 1 RPC B LOST (equipment)
Effect: 44 IMU 3 RPC A LOST (equipment)
Effect: 43 IMU 1 UNPOWERED (functionality)
Effect: 42 IMU 1 LOST (equipment)
Effect: 38 GPS 1 LOST (equipment)
Effect: 4 IMU SYSTEM 1-FT (functionality)
Effect: 3 IMU FANS 1-FT (functionality)
Effect: 2 GPS SYSTEM 1-FT (functionality)

93 IMU SYSTEM 0-FT (functionality) can now be caused by loss of :
 * FUEL CELL # 3
 * GPC 2
 * GPC 3
 * MN C DA3
 * FPC 3
 * FF 3 MDM
 * FF 2 MDM
 * CNT CA3
 * IMU 3 RPC C
 * IMU 2
 * IMU 3
  FUEL CELL # 2 and CNT BC1 or IMU 2 RPC C**
 ** MN B DA2 and CNT BC1 or IMU 2 RPC C
 ** FPC 2 and CNT BC1 or IMU 2 RPC C
 ** CNT BC2 and CNT BC1 or IMU 2 RPC C
 ** CNT BC1 and IMU 2 RPC B
 ** IMU 2 RPC B and IMU 2 RPC C

IMPACT ASSESSMENT SYSTEM AND METHOD FOR DETERMINING EMERGENT CRITICALITY

FIELD OF THE INVENTION

This invention generally relates to diagnostic systems, and more specifically relates to vehicle health management systems.

BACKGROUND OF THE INVENTION

Modern vehicles are increasingly complex and therefore require highly capable command and control systems. In the face of operational anomalies, brought on by equipment or operational failures, these vehicles require additional capabilities to identify and mitigate against the effects of failures. Vehicle Health Management (VHM) systems complement the command and control systems by helping to address failures and anomalies so that the command and control systems can operate effectively in nominal (healthy) conditions. The VHM system manages the health of the vehicle system, identifying failure states and helping mitigate the effects of these failures so that the vehicle may be returned to its nominal state. Thus, the VHM system facilitates safe operation of the vehicle in the face of failures in the system.

One way in which a VHM system can manage the health of a vehicle system is to determine the consequence of failures in the system. Specifically, when a component in a complex system fails it is desirable to accurately determine all the potential consequences of that failure to effectuate a proper response. These consequences can include direct downstream failure propagations and changes in criticality of other non-failed components.

Changes in criticality of non-failed components can occur in vehicles that include multiple redundant systems. In such a system, the failure of one redundant component can change the criticality of remaining components. For example, in a double redundant system, if one redundant component fails the remaining redundant component becomes more critical to the operation of the vehicle.

Unfortunately, current VHM systems have been unable to effectively determine consequence of component failures in the system. In particular, current VHM systems have been unable to efficiently and accurately determine changes in criticality that can occur as a result of failures in the system. Thus, what is needed is a system and method for determining changes in critically that result from component failure in the system.

BRIEF SUMMARY OF THE INVENTION

The present invention provides an impact assessment system and method for determining emerging criticality in a complex system. The impact assessment system includes a component dependency model and an emergent criticality analyzer. The component dependency model describes the relationships between components in the system and their underlying dependency and criticality relationships. The impact assessment system receives component failure data from the complex system and uses the component dependency model and emergent criticality analyzer to determine the impact of the component failure on the criticality of remaining components in the system. The impact assessment system is thus able to determine how component failures in the complex system can impact the criticality of remaining components in the complex system and thus can assist in determining how those components may or may not be safely used in further operational activities. In addition, these impacts can be passed to a status reporting system where they can be made available for further analysis.

The impact assessment system and method can be implemented as part of a vehicle health management (VHM) system to provide real time impact assessment of when failures in the complex system result in emerging criticalities. In such a real time system, the impact assessment system can be used to warn system operators of changes in emerging criticality that can adversely affect the safety, performance and reliability of the complex system.

In another embodiment, the impact assessment system and method can be implemented as part of design tool used to evaluate the effects of component failures during the design process. As such, the impact assessment system and method can be used improve the complex system design to facilitate greater reliability, safety and performance.

BRIEF DESCRIPTION OF DRAWINGS

The preferred exemplary embodiment of the present invention will hereinafter be described in conjunction with the appended drawings, where like designations denote like elements, and:

FIG. 10 is a schematic view of an exemplary status report;

DETAILED DESCRIPTION OF THE INVENTION

The present invention provides an impact assessment system and method for determining emerging criticality in a complex system. The impact assessment system receives component failure information and determines the impact of the component failure on the criticality of the remaining components. The system and method can be used for impact assessment in a variety of complex systems. For example, the system and method can be used in vehicle systems such as the Space Shuttle or the International Space Station. Other examples of complex systems for which the system and method can be used include submarines and other non-vehicular applications such as networks of computers and electrical power distributions.

In many complex systems critical functions are provided using multiple, interconnected, redundant components. For example, a vehicle may have multiple redundant power supplies used to power critical systems. A vehicle with three independent power supplies is referred to as triple redundant or "2-away" from non-redundancy. If one of the multiple redundant power supplies fails, the system goes from triple redundant to double redundant or "1-away" from non-redundancy. Thus, a failure in one of the power supplies changes the criticality of the remaining power supplies. Specifically, a failure of either of the remaining power supplies would now result in a non-redundant system where as before this would not have been the case. Thus, increased criticality of the remaining power supplies has emerged as a result of the failure of the first power supply.

The failure of a component thus results in a functional change in the system status, and may require a corresponding change the operation of the system. For example, a loss of redundancy may trigger constraining flight rules that govern a vehicle's operation. Thus, the loss of one component may limit the operations that the vehicle is allowed to perform, or it may require the vehicle to abort its mission.

In a complex system, thousands of different components can be interdependent, and in such a system determining the emerging criticality of the remaining components in response to failure is a significant task. The system and method provide the ability to automate this analysis and enable it in real time. Additionally, the system and method can be used to perform this analysis as part of a design tool used to validate the system.

Figure 1:
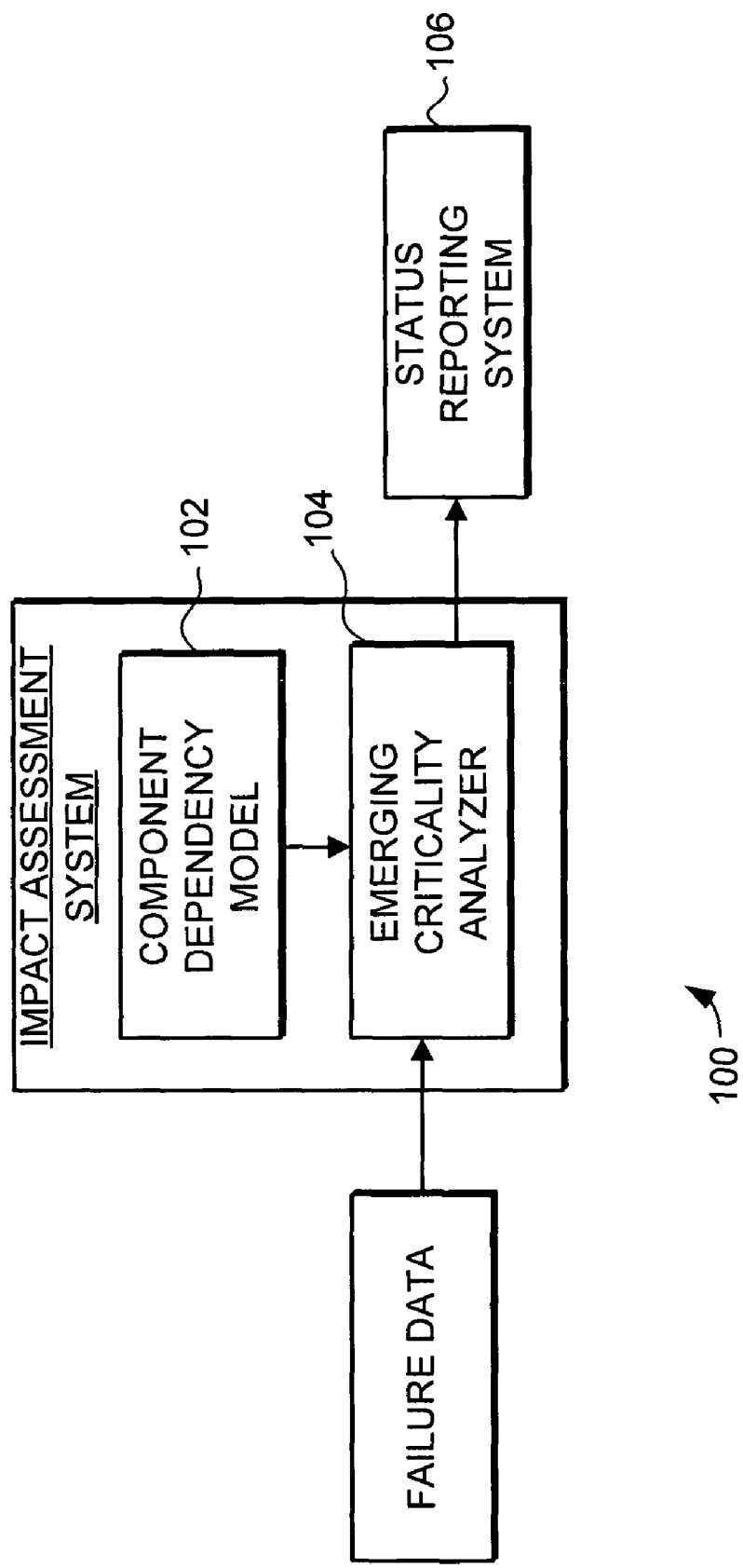
FIG. 1 is a schematic view of an impact assessment system.

Turning now to FIG. 1, a schematic view of an impact assessment system 100 is illustrated. The impact assessment system 100 includes a component dependency model 102 and an emergent criticality analyzer 104. The component dependency model 102 describes the relationships between components in a complex system and their underlying dependency and criticality relationships. The impact assessment system 100 receives failure data from the complex system and uses the component dependency model 102 and emergent criticality analyzer 104 to determine the impact of the failure on the criticality of remaining components in the complex system. As an example, the impact assessment system may determine how component failures change the redundancy status of the remaining good components in the complex system. The impact assessment system 100 is thus able to determine how component failures in the complex system can impact the criticality of remaining components in the complex system and thus can assist in determining how those components may or may not be safely used in further operational activities. In addition, these impacts can be passed to a status reporting system 106 where they can be made available for further analysis.

The impact assessment system 100 and can be implemented as part of a vehicle health management (VHM) system to provide real time impact assessment for the complex system. In such a real time system, the impact assessment system 100 can be used to warn system operators of changes in emerging criticality that can adversely affect the safety, performance and reliability of the complex system. In another embodiment, the impact assessment system 100 can be implemented as part of design tool used to evaluate the effects of component failures during the design process. As such, the impact assessment system and method can be used improve the complex system design to facilitate greater reliability, safety and performance.

Figure 2:
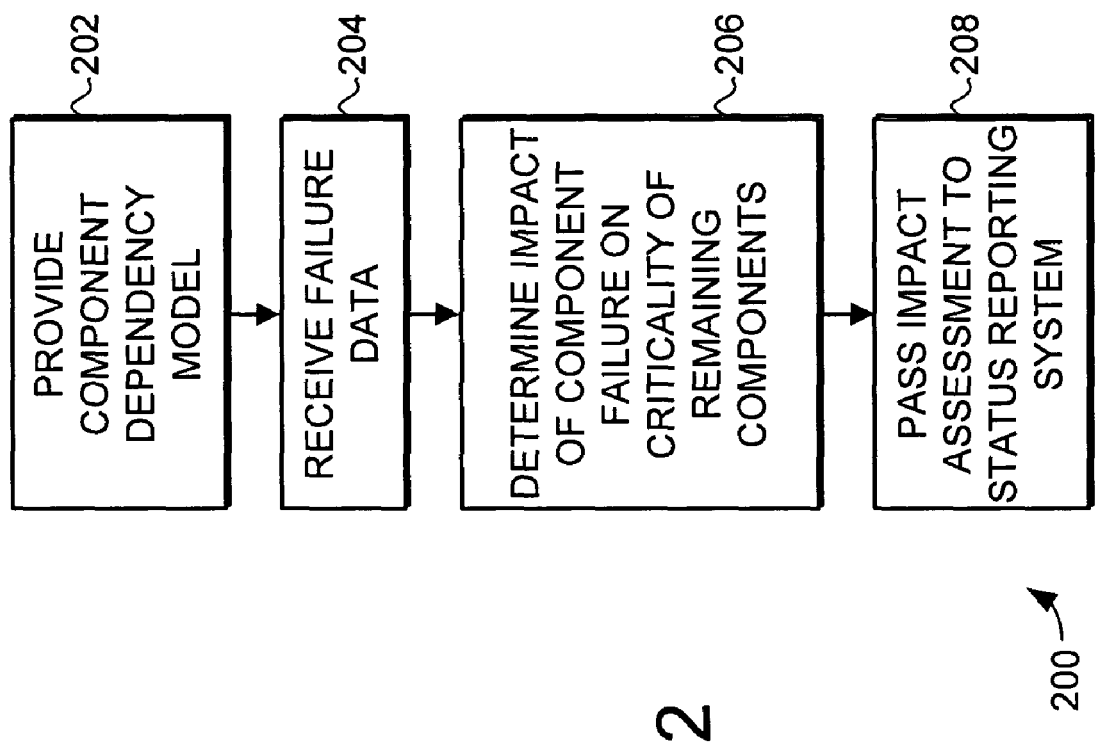
FIG. 2 is a flow diagram illustrating an impact assessment method.

Turning now to FIG. 2, a method 200 for determining impact assessment in a complex system is illustrated. The method 200 determines the impact of component failures on the criticality of remaining components in the complex system. The method 200 can be implemented in real time to determine emerging criticality in an operating system, or can be implemented as part of design tool used to evaluate the effects of component failures during the design process. The first step 202 in the method 200 is to provide a component dependency model. The component dependency model describes the relationships between components in the complex system and their underlying dependency and criticality relationships. In one embodiment, the component dependency model is derived from a graphical representation of physical and functional components in the complex system, and includes output functions and annunciation functions for each component.

The next step 204 is to receive failure data about the complex system. The failure data includes information regarding components that have partially or completely failed. In a real-time implementation, the failure data can be provided from a diagnostic system that evaluates component health during operation of the system. In a design tool implementation, the failure data can be provided in the form of simulated failures that are manually or otherwise entered to evaluate the effects of those failures on a proposed system design. In either case, the failure data provides information regarding the failures of component in the system that will serve as the basis for impact assessment.

The next step 206 is to determine the impact of component failure on the criticality of remaining components. Specifically, the method uses the component dependency model to determine how failures in components change the redundancy status of remaining components in the complex system. This can be accomplished by computing the direct results of the component failure, and then computing the results of one or more additional hypothetical failures in the system. By computing the direct results and the results of one or more additional hypothetical component failures, the impact of the component failure on emergent criticality of other components can be determined. Thus, emergent criticality is defined as occurring when a component takes on a new and higher level of system importance (criticality) as a result of other failures in the system than it had in the absence of those failures.

The next step 208 is to pass the impact assessment to a status reporting system. In general, the impact of failures on emerging criticality would be combined with other status information and passed to the system controllers. Thus, the method can provide needed data on emerging criticality to facilitate proper response to component failures.

Figure 3:
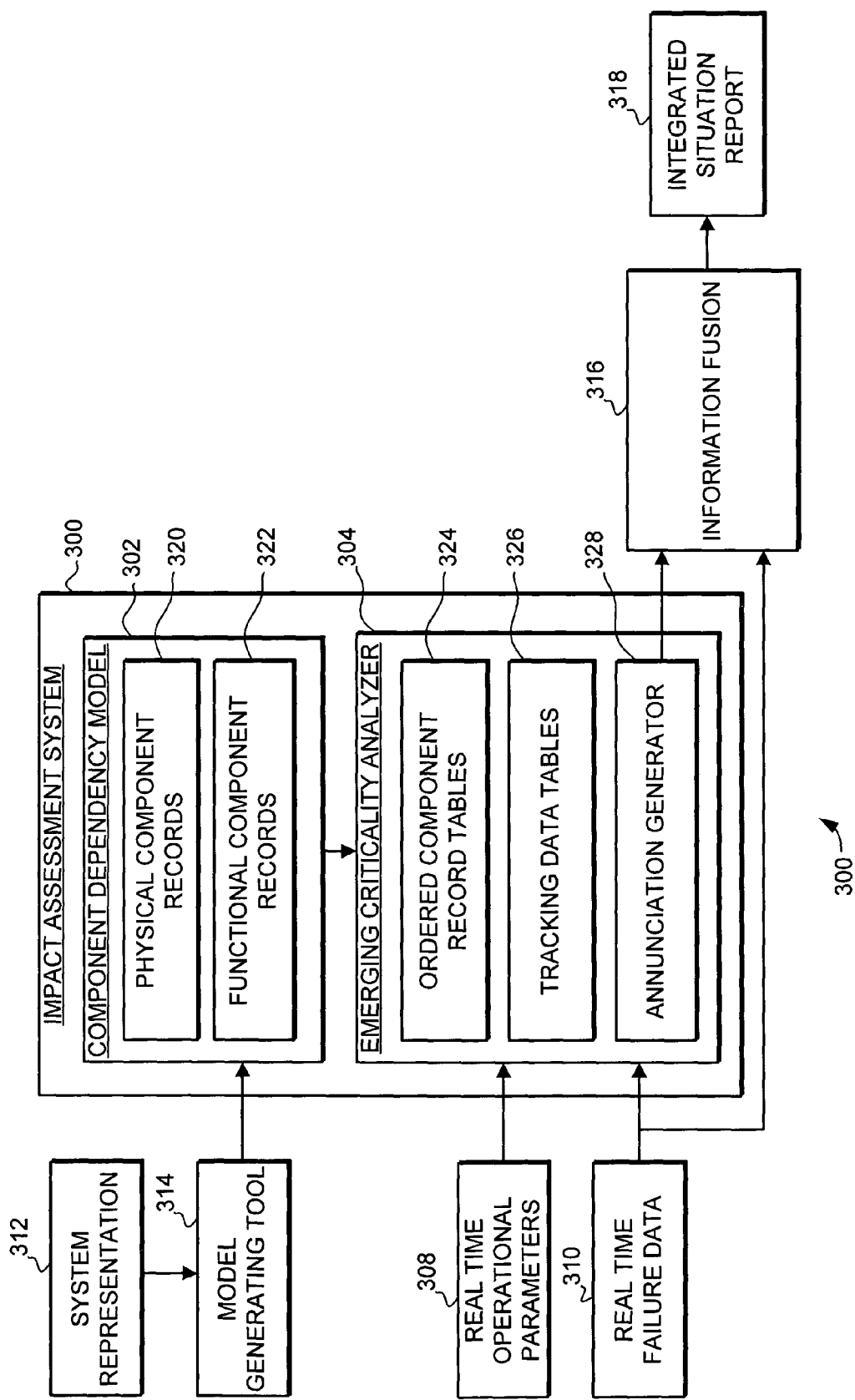
FIG. 3 is a schematic view of an impact assessment system in accordance with a preferred embodiment of the present invention.

Turning now to FIG. 3, a schematic view of a first embodiment impact assessment system 300 is illustrated. The impact assessment system 300 includes a component dependency model 302 and an emergent criticality analyzer 304. In this illustrated embodiment, the component dependency model 302 is generated from a system representation 312 using a model-generating tool 314 and includes physical component records 320 and functional component records 322.

Furthermore, in this illustrated embodiment the emerging criticality analyzer 304 includes ordered component record tables 324 generated from the component dependency model 302. Additionally, the emerging criticality analyzer 304 includes tracking data tables 326 and an annunciation generator 328. The emerging criticality analyzer 304 receives real time operational parameters 308 and real time failure data 310 from the complex system, and uses that data to determine the impact of the failure on the criticality of remaining components in the complex system. Annunciations describing the emerging criticality are passed to the information fusion 316, which is combined with the real time failure data 310 to create an integrated situation report 318.

The component dependency model 302 describes the relationships between components in the complex system and their underlying dependency and criticality relationships. Specifically, the component dependency model includes a plurality of physical component records 320 and a plurality of functional component records 322. Each physical component record 320 corresponds to a physical component in the system, and describes the operation and relationship of the physical component to other parts of the system.

It should be noted that not all physical components need to be modeled with a separate corresponding component record 320. Instead, the modeling of physical components can be based on a unit of failure, with clusters of components that fail as a group, or whose functionality succeeds or fails as a state of the group, can be modeled as a single composite component. For example, in many cases it would be desirable to make a physical component record for each relatively high level device, such as each power supply or each IMU. However, in some cases it may be desirable to have an increased level of granularity. In this case, individual parts within each power supply could correspond to a separate physical component record. Again, it will be desirable in most cases to select the granularity to correspond to the likely failure and replacement modes of the object. For example, it would not typically be desirable to assign different physical component records 320 to different parts within a power supply component if the power supply is most likely to fail and be replaced as a unit.

Each physical component record 320 preferably includes several data elements that describe the operation and relationship of the corresponding physical component to the rest of the system. For example, each physical component record 320 can include data elements a component output function, a component annunciation function, and one or more input weights. The component output function would be used to mathematically describe the functioning of the component based on the weighted inputs, where each of the weighted inputs corresponds the functioning of an upstream component. Examples of functions include "IN_RANGE", "ABOVE_VALUE" and "BELOW_VALUE" functions. Thus, the component output function is used to determine the performance of the component, which is then passed to dependent, downstream components. Weighting the inputs and calculating according to the component output function provides the ability to model and account for partially functioning components.

Likewise, the annunciation function can be used to mathematically describe what circumstances trigger an annunciation for the corresponding component, based again upon the weighted inputs. Thus, the values at the inputs of the component will indirectly determine if an annunciation corresponding to that component is triggered.

The functional component records 322 likewise correspond to logical functions in the system, and thus describe the operation and relationship of the logical function to other components in the system. The functional component records 322 provide the ability to make annunciations for changes in state not directly related to a single component failure. Thus, logical functions can summarize or aggregate one or more physical components. For example, a logical function can be assigned for "power available" to an element, and can derive from several physical power supplies that can actually provide the power. Additionally, functional components can be assigned for different levels of fault tolerance. In this example, a functional component and it's corresponding record 322 can be created for 2-fault tolerance (i.e., 2-away from non-redundancy), and separate functional components created for 1-fault tolerance and 0-fault tolerance. Thus, those three situations can then be annunciated independently.

Each functional component record 322 can also include a component output function, a component annunciation function, and one or more input weights. Again, the output function would define the output of the functional component and the annunciation function would define when the annunciation for the function is triggered.

Thus, together the physical component records 320 and functional component records 322 are part of a component dependency model 302 that is used in impact assessment. The component dependency model 302 can be generated using the system representation 312 and the model-generating tool 314. In this embodiment, the physical and function components of the system, and the relationship between these components are defined using a graphical or other representation. For example, the system representation 312 can be created as a graphical representation using a suitable drafting program. The model generating tool 314 then processes the graphical system representation to create the component dependency model 302. A specific example of this process will be discussed in greater detail below.

The component dependency model 302 is used by the emerging criticality analyzer 304 to determine the impact of component failures on the criticality of remaining components. The emerging criticality analyzer 304 receives real time operational parameters 308 and real time failure data 310 from the complex system. The failure data 310 would typically be provided from a diagnostic or control system that includes the ability to recognize when individual components are failed or failing, either fully or partially. That information is passed to the emerging criticality analyzer 304, where it is used determine the impact assessment in light of those failures.

The operational parameters 308 provide operational status information that can be needed to determine emerging criticality. For example, the operational parameters 308 can include information as to what mode a system is in, where the operational mode affects component usage and thus the criticality of components. As one specific example, the Space Shuttle operates in several distinct modes, such as launch mode, orbit mode and re-entry mode. Each of these modes has its own operational requirements and thus requires different levels of redundancy for different elements. Providing the current operational mode to the emerging critically analyzer 304 provides the ability to determine emerging criticality based on the correct current operational mode of the system, and facilitates recognition of changes in criticality due to changes in operational mode.

As stated above, the emerging criticality analyzer 304 includes ordered component record tables 324, tracking data tables 326 and an annunciation generator 328. In one embodiment, the ordered component record tables 324 are created by parsing the component dependency model 302 to create a pre-ordered computable table that can be stored in memory and used by analyzer 304. The ordered component record tables 324 are ordered such that a single pass through the table is all that is required. In this ordering, there are no "forward references" as would be found in a typical spreadsheet implementation. This ordering is required to enable the fast and deterministic processing that is required in a real time environment.

The tracking data tables 326 store information used during the emerging criticality analysis. The data can include lists of initial failures used to reflect either current failures in a live, online system, or hypothesized failures in an offline training situation. This data can also include a listing of base case annunciations (BaseCaseAnnunciations) that show what direct results and annunciations are anticipated given the initial failures described above. The data can also include single and double failures in isolation used to determine "emergence" by comparing new behavior with existing behaviors. The data can also include the results of the analysis, including direct results, "one-away-from" (one-from) and "two-away-from" (two-from) results from component failures. This data is stored in a SingleFailuresInIsolation list and a DoubleFailuresInIsolation list. SingleFailuresInIsolation list identifies all expected annunciations for each possible single failure when considered in isolation (from all other possible failures). DoubleFailuresInIsolation list identifies all expected annunciations from every possible double failure when considered in isolation. Finally, this data can include an exclusion list (ExclusionList) which represents the aggregate collection of behaviors which are already expected in a given initial situation, and from which comparisons with a hypothesized extended failure scenario may be contrasted. These are used in the computation of "emergence", described below. Of course, other data types could also be included.

The annunciation generator 328 takes the outputs of emerging criticality analyzer 304 and generates appropriate annunciations. As an example, the annunciation generator processes the component annunciation functions for each component to determine if the annunciation corresponding to that component should be activated. If the output of the component annunciation function indicates that the annunciation should be triggered, the appropriate annunciation is identified and passed to the information fusion 316, where it is combined with other diagnostic information and sent in an integrated situation report 318.

Thus, the impact assessment system 300 receives operational and failure data from the complex system and uses the component dependency model 302 and emergent criticality analyzer 304 to determine the impact of the failure on the criticality of remaining components in the complex system.

To give one specific example of calculating emergent criticality, assume that devices A, B and C had previously failed. During a previous criticality calculation, all the direct results of these failures and their annunciations were determined and stored in the tracking data tables. This case makes up the current base reality of base case of the system. The impact assessment system 300 allows a look beyond the current reality.

For example, what if a device D failure occurred now? To determine what criticality emerges from the failure of D it is added as failed components in the tracking data. The results of the failure then calculated. This would involve computing the ordered component record tables to see what devices are failed and what annunciations are made with the failure of D. The result would all the failures that now occur, and is thus an "all failures list" that is stored in the tracking data tables 326.

Next, failures that were already present are deleted from the list. Specifically, things that were already on the BaseCaseAnnunciation, and also the SingleFailuresInIsolation for the component D are made part of an "exclusion list". The exclusion list is then subtracted from the "all failures list." The remaining list of criticalities are those that are emergent. Thus, they comprise a list of criticalities that would result from a failure in D whereas previously a failure in D would not have caused them. Thus, they constitute emerged criticalities for D.

Now, to give a second example, assume a double failure of components M and N. M and N are added as failed components to the existing reality state, and the ordered component record tables 324 are recomputed to determine what annunciations are now made. Again, this is an "all failures list".

Next, the things that were already present are deleted from the "all failures list". This requires subtracting anything found in the BaseCaseAnnunication list, anything found in the SingleFailuresInIsolation list for both M and N independently, and anything found for M and N together in the DoubleFailuresInIsolation list. Thus, this exclusion list is the sum of all these four lists. Any that remain in the "all failures list" after all those subtractions are emergent, meaning that they only arise if both M and N fail in the present reality situation.

Figure 4:
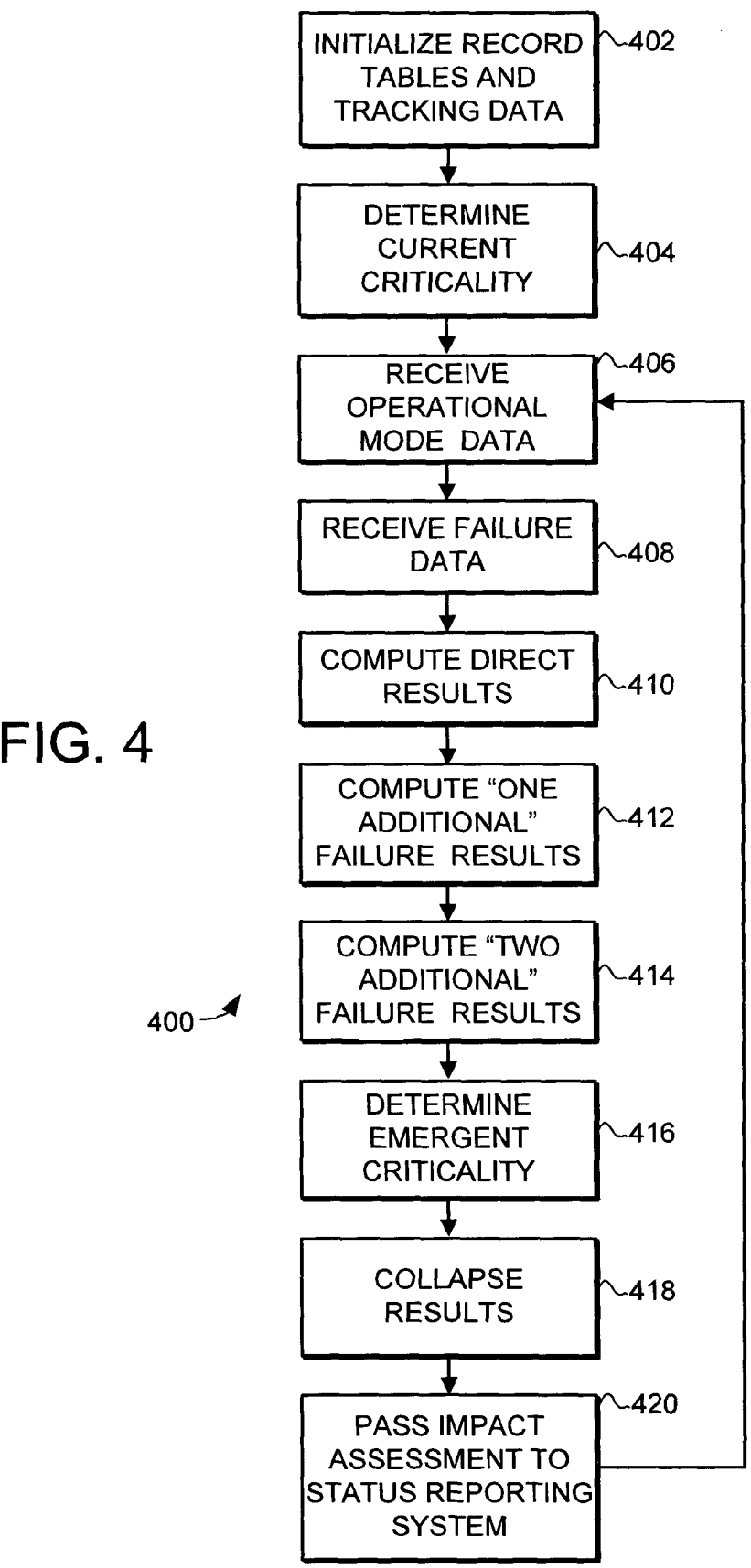
FIG. 4 is a flow diagram illustrating an impact assessment method in accordance with a preferred embodiment of the present invention.

Turning now to FIG. 4, a method 400 for performing impact assessment is illustrated. The method 400 determines the impact of failures in a system on the criticality of remaining components. The first step 402 is to initialize tables and tracking data. This step typically involves processing the component physical and functional records in the component dependency model and creating ordered component record tables that are stored in memory during processing. Additionally, this step comprises initializing tracking with information such as existing component failures and other such information.

The next step 404 is to determine the current criticality of components in the system. This base case criticality determination can involve three distinct steps. First, the base case annunciations are computed assuming no additional failures in the system. The base case annunciations are thus those that occur for known failures and under all known operational mode values. Next, the annunciations for single failure are computed for each possible additional single failure that could happen in the system. These additional failures are those could hypothetically happen in the future, and thus exclude those that have already occurred. Next, the annunciations for double failures are computed for each possible pair of additional failures that could happen. In general, computing the annunciations for single and double failures can be done by making temporary changes to the values of each component (or pair of components), recomputing the entire set of resulting annunciations, recording that result, and then reinstating the actual values for the substituted components. Typically, the base case failures, single failures in isolation and double failures in isolation are each computed and stored in a separate array. These three arrays define the current criticality of the components in the system. These three arrays can then be used to determine the emergence of new criticalities in response to changes in component health and operational mode status.

With the system initialized cyclic processing begins. The next step 406 is to receive operational mode data. Again, the operational mode data is generally required to determine the criticality of components in the system because different types of operations have different system requirements. It should be noted that in many complex systems, the operational modes do change over time, and thus, emerging criticality calculations must be able to account for these changes in these types of systems.

The next step 408 is to receive failure data. Typically, the failure data is received from a diagnostic system that is monitoring component performance in the complex system. Thus, when a component partially or completely fails, that information is provided as failure data in step 408. As another example, the failure data can comprise hypothetical failures that are used for system design and/or testing.

With the operational and failure data provided, the next step 410 is to compute the direct results of the failure. Computing the direct results of a failure involves determining the downstream failures of the remaining components that arise both directly and transitively from the known component failures in the system. This can be accomplished by computing the component output, and annunciation functions provided in the component records for each of components in the system, given the component failures identified in step 406 and any initial component failures. The result of this computation is a list of all direct and indirect failed components, and the annunciations that arise there from. One specific exemplary method 500 for computing the results of component failure that can be used in step 410 will be described below in greater detail with reference to FIG. 5.

The next step 412 is to compute "one-additional" failure reports. This involves taking the direct failure results calculated in step 410 and computing the hypothetical results of an additional component failure in the system. By calculating the results of one additional component failure for every additional possible single component failure, the emerging criticality (of each of those hypothetically failed components) can be assessed. It should be noted that that step 412 involves numerous calculations of emerging criticality, one for every other remaining component that could fail in the system. Specifically, for each hypothetical component failure, the component output and annunciation functions are computed for all the components in the system, given the current component failures and the additionally hypothetical component failure. Taken together, the results comprise an array of the changed criticalities that would occur with one additional failure. Like step 410, the computing of results of component failures for each of the remaining components can be done using the method 500 illustrated in FIG. 5.

The next step 414 is to compute "two-additional" failure reports. This involves taking the one additional failure results calculated in step 412 and computing the hypothetical results of yet another additional component failure in the system. By calculating the results of yet another additional component failure for every additional possible component failure, the step can determine the emerging criticality that would occur for a failure in any two of the remaining components. Because of the extremely large number of combinations of component failures that are possible, this step would typically involve a very large number of calculations of emerging criticality. Taken together, the results comprise an array of the potential criticalities that could occur with any two additional component failures in the system. Like step 412, the computing of results of component failures for each of the remaining components can be done using the method 500 illustrated in FIG. 5.

The next step 416 is to determine the emergent criticality based on the calculations made in steps 404, 410, 412 and 414. Specifically, to determine the emergent criticality previously detected criticalities are removed from the listing of emergent criticalities. These previous criticalities include those determined for the base case in step 404, and those determined in any previous calculation of steps 410, 412 and 414. This assures that the listing of emergent criticalities includes only new criticalities that the system has not yet passed to the status reporting system.

The next step 418 is to collapse the results. Because many failure combinations would result in the same emergent criticality, it is desirable to collapse the results such that the reporting is as concise as possible. Thus, different failures or combinations of failures result in the same emergent criticality are grouped together for more concise reporting. With the results collapsed, the next step 420 is to pass the collapsed results to the status reporting system. As described above, the results can thus be combined with other diagnostic results and delivered to the users of the system.

With the results passed to the status reporting system, the method 400 returns to step 406 where it waits for changes in operational mode data or the receipt of additional failure data. When additional failure data or changes in operational mode data occur, the emerging criticality is again calculated using steps 410 to 420. Again, emergent criticality occurs when a component takes on a new and higher level of system importance (criticality) as a result of other failures in the system than it had in the absence of those failures. The status report can include several types of information. For example, it can include a listing of the actual failed components and operational mode values. These define the base case for the analysis. It can also include a priority-ordered list of direct effects, i.e., things which are now failed, including both physical and functional components. Finally, it can include listings of component failures that can induce changes in fault tolerance, including those single failures and double failures that have emerged as new potential causes of fault tolerance change in the system. These are all examples of emergent criticality that crew and operational staff need to be informed of.

Returning now to FIG. 4 and method 400, it should also be noted that while method 400 currently calculates the direct results, the "one additional" failure results, and the "two additional" failure results, that the method can be adapted to calculate more or less results with no loss of generality. For example, in some cases it may not be necessary to calculate two additional failure results to meet the desired level of safety. Conversely, in some applications it may be desirable to calculate three or more levels of failure results and their impacts on emerging criticality. It should be noted that the number of calculations needed to compute addition levels of failures to cover all combinations of additional failures can require significant computing resources. For this reason, an efficient method of pre-ordered computation described below is highly desirable. In addition, it should be noted that these computations are very amenable to parallel computing (each of the independent failure cases can be computed independently) if appropriate hardware capability is available.

Figure 5:
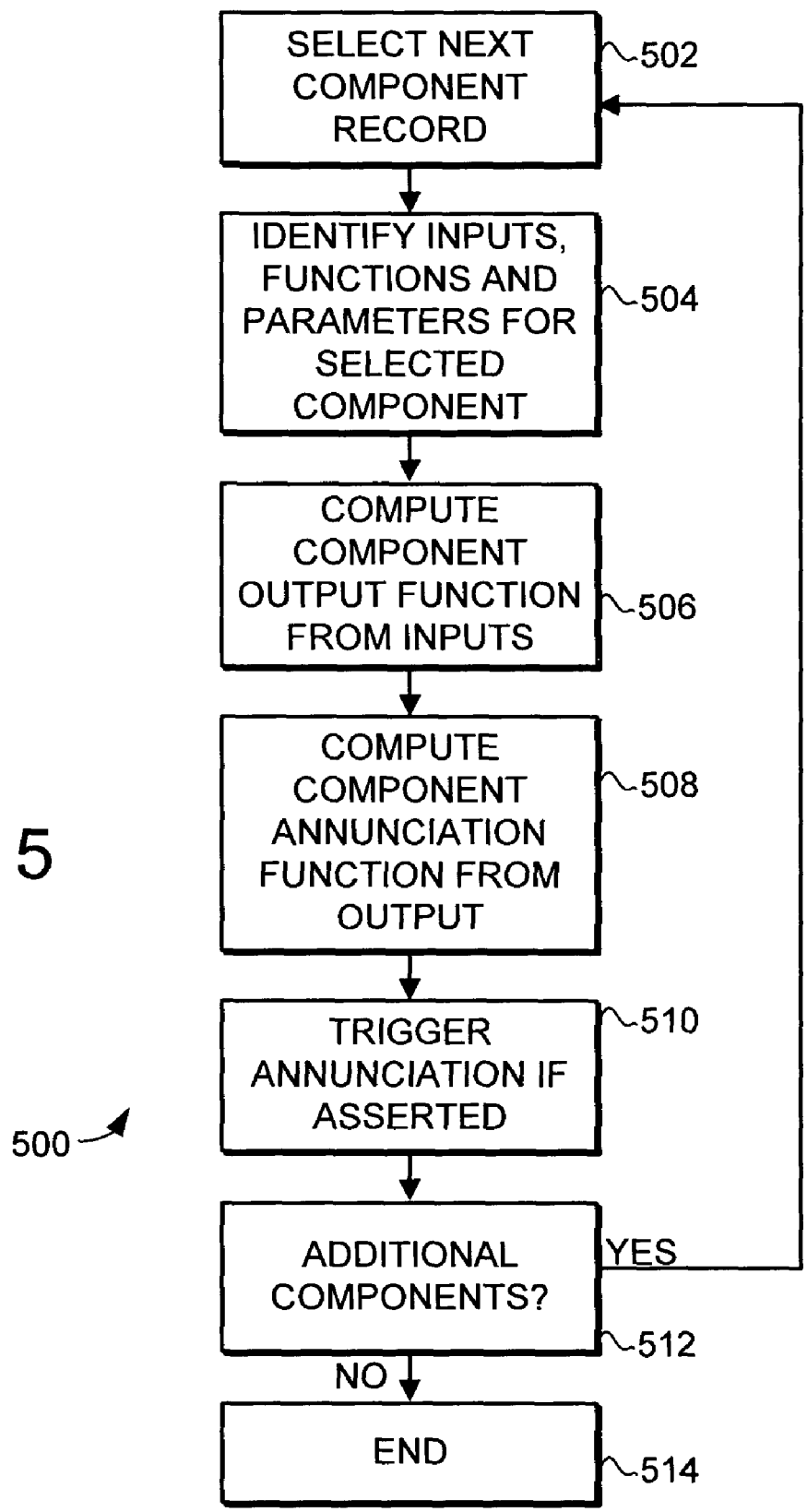
FIG. 5 is a flow diagram illustrating a method for computing results of component failure.

Turning now to FIG. 5, a method 500 for computing results of component failure is illustrated. As mentioned above, the method 500 can be used in steps 404, 410, 412 and 414. Specifically, the method 500 would typically be performed for each component in the system, using a pre-ordered component record table that includes the physical component records and functional component records for all the components in the system. As described above, the method would be performed for the current component failures in step 410, and for combinations of the current component failure and one additional component failure in step 412 and for each combination of current component failure and two additional component failures in step 416.

The first step 502 is to select the next component record. Again, in one embodiment the component records are formatted into a pre-ordered component record table, with the order defined such that a single computational pass through the table is sufficient. In particular, that there are no forward references in the record table, thus resulting in a finite and deterministic computational path suitable for use in a real time system. In step 502, the next record is selected for processing, and this continues until the processing is performed for component record in the component dependency model.

With the next component selected, the next step 504 is to identify the inputs, parameters, and component output and component annunciation functions for the selected component. These values are preferably included as part of the component dependency model. The input values represent the output results from upstream components, and thus represent whether upstream component failure has impacted the operation of the corresponding component.

With the inputs, functions and other parameters identified, the next step 506 is to compute the component output function using the input values. This creates the output to the component output function, which is then passed as an input to any down stream components. The output of the component output function is a representation of the corresponding component performance in light of upstream component failures, and thus indicates whether the corresponding component has failed as a consequence of upstream failures. As an example of an output function, the output function could comprise an IN_RANGE function, where parameters are used to select the range used for the output function. In such a function, the inputs are summed together according to their defined weights. If the weighted sum is within the range specified in the parameters, then the IN_RANGE output function outputs a specified value. If the weighted sum is not within the specified value, then a different output is generated. Other examples of output functions include BELOW_VALUE or ABOVE_VALUE, where these output functions would determine if the weighted sum was above or below a specified parameter. Of course, these are just examples of the type of output functions that could be used.

The next step 508 is to compute the component annunciation functions from the component function output. Specifically, the output of the component output function is used to determine if an annunciation regarding the corresponding component should be asserted. Typically, the annunciation would be asserted if the performance of the component, as measured by the component output function, falls below a defined level or outside a defined interval.

If the annunciation function is asserted, the next step 510 is to trigger the annunciation. If the annunciation for that component is triggered, that annunciation is sent to the status reporting (e.g., information fusion) component.

Like the output function, the annunciation function could comprise a variety of types of functions, including IN_RANGE, ABOVE_VALUE and BELOW value. In these cases the functions would again be computed with specified parameters, using the output of the output function for the same component. For example, the annunciation function could use an IN_RANGE function that determines if the output is between two specified values. If the output of the output function is between those specified values, then the annunciation is triggered. Again, these are just some examples of the type of functions that could be used.

The next step 510 is to determine if there are additional components that need to be calculated. Again, the method 500 would typically be performed for each component in the system, in the ordered specified in the ordered component record tables. If there are remaining components, the method returns to step 502 where the next component is selected. This continues until there are no more components, and the process ends at step 514.

Again, when used for computing in method 400, the method 500 would typically be performed with the current component failures in step 410, and for combinations of the current component failure and one additional hypothetical component failure in step 412 and for each combination of current component failure and two additional component failures in step 414. Doing so facilitates the determination of all the current annunciations that are asserted, and the annunciations that would be asserted if an additional component failure occurs or any combination of two additional component failures occur. Thus, the methods 400 and 500, when used together can determine emerging criticality in light component failures in the complex system.

Figure 6:
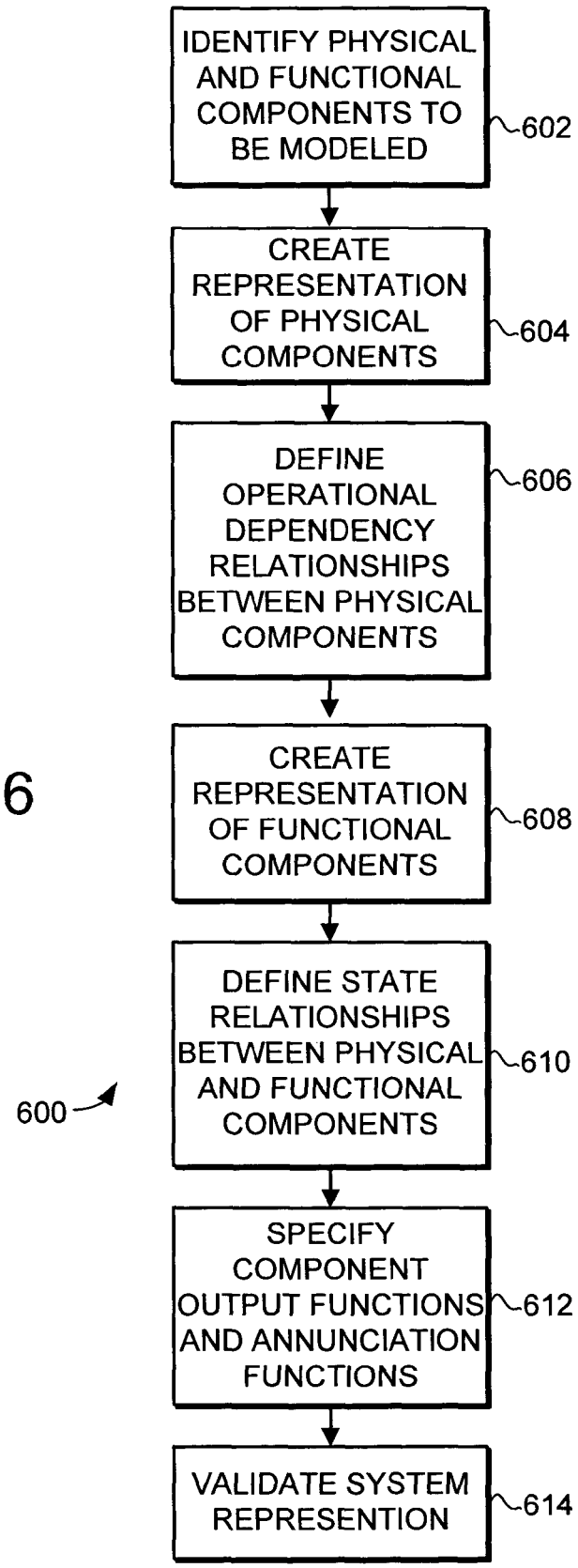
FIG. 6 is a flow diagram illustrating a method for creating a system representation of a complex system.

As described above, a variety of techniques can be used to create the component dependency model. For example, a system representation can created that defines the components and dependencies of the complex system. That system representation can then be processed by a model generating tool to create a component dependency model. Turning now to FIG. 6, an exemplary method 600 for creating a system representation of a complex system. The system representation created by method 600 can be used to create a component dependency model. The resulting component dependency model can be used in a variety of applications, including for real time impact assessment or as part of a design tool used to validate a complex system design.

The first step 602 is to identify physical and functional components in the complex system that is to be modeled. This would typically involve gathering system information from schematics, handbooks flow charts and the like, determining a modeling strategy, and then identifying which physical and functional components in the system are to be modeled.

It should be noted that not all the physical components in a system may need to be modeled. Instead, the selection of physical components that are to be modeled can be made on the basis of "unit of failure". Thus, clusters of components that will fail as a group, or whose functionality succeeds or fails as a feature of the state of the group, can be modeled as a single composite functional component.

Likewise, identifying functional components that are to be modeled involves the determination of logical functions that are not directly related to a single physical component. Thus, functional components provide the ability to make annunciations for changes in state not directly related to a single component failure. Thus, logical functions can overlap one or more physical components. Again, as an example, logical functions can be assigned for power available to an element, and can depend from several physical power supplies that can actually provide the power. Additionally, functional components can be assigned for different levels of fault tolerance.

Figure 11:
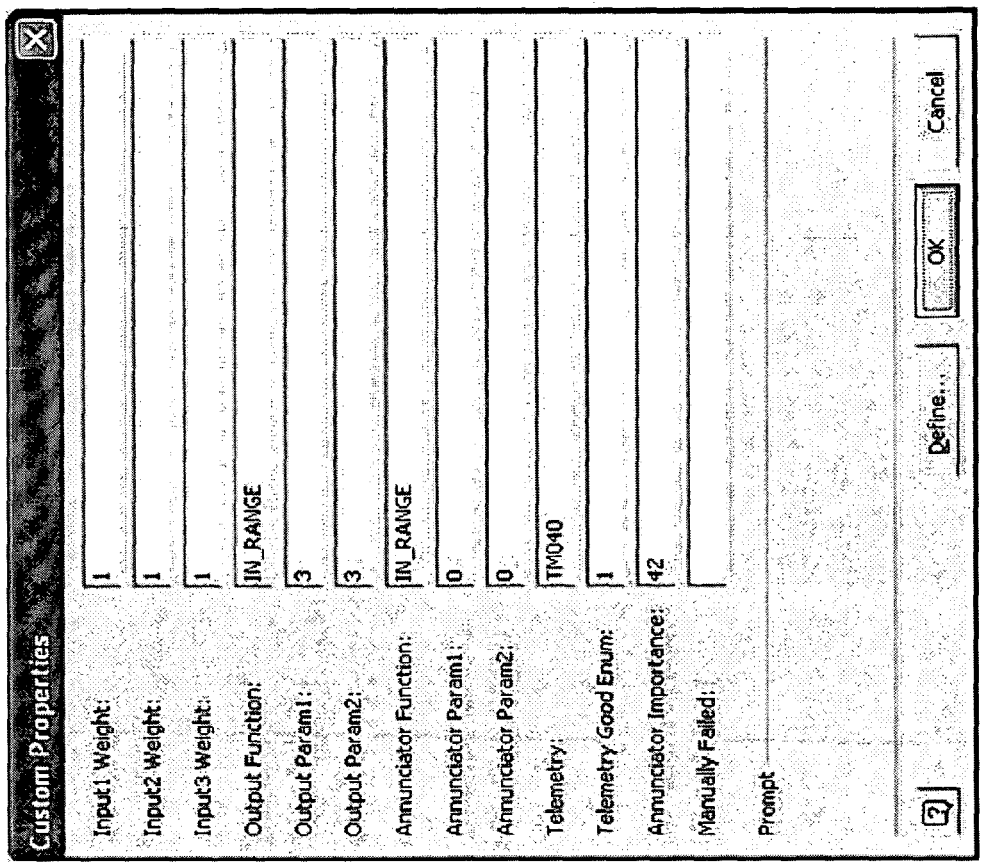
FIG. 11 is a schematic view of an exemplary custom properties input menu.

With the components identified, the next step 604 is to create a physical representation of the physical components. In one preferred embodiment, the physical representation is created using a computer aided drafting tool such as Microsoft Visio, AutoCAD or TEAMS. These tools allow physical and functional components to be defined by drawing corresponding graphical elements. Furthermore, it is generally desirable to use a tool that facilitates the creation of custom properties to allow a user to specify specific parameters of the components. For example, to allow a user to specify inputs and other parameters. Thus, a user can create a visual element to represent a physical component, and can then specify the various parameters of the component that will be used in impact assessment. Turning now to FIG. 11, an exemplary custom properties input window 1100 is illustrated. The window gives the user of the graphical drafting program the ability to specify a variety of different parameters for the component.

Returning to FIG. 6 and method 600, step 604 could thus typically involve the drawing of graphical elements for each physical component to be modeled, and specifying the parameters of each physical component as custom properties of the graphical elements.

It should be noted that while graphical programs are generally preferred as they provide the ability to visualize the system, that text based systems could also be used to create the representation of physical components in the system.

The next step 606 is to define operational dependency relationships between physical components. This step can likewise be accomplished using a graphical drafting tool Specifically, by using a graphical tool the dependency relationships can be defined by creating connecting lines between elements. For example, a single headed arrow can be used to show a direct operational dependency relationship between physical components. The head of the arrow would typically be connected to the physical component which is dependent in the relationship. Likewise, the tail of the arrow would be connected to the component depended upon. Thus, the dependency relationship between two physical components can be defined using the graphical drafting tool.

The next step 608 is to create a representation of functional elements in the system. Like the creation of the physical component representation, this can be accomplished by drawing suitable elements to represent the functional components. Then, like the physical components, the inputs and other parameters can be defined using custom properties specified for the drawing elements.

With the functional elements defined, the next step 610 is to define state relationships between physical and functional components. Again, using a graphical tool the state relationships can be defined by creating connecting lines between elements. In general, state relationships are defined as the mutually contributor relationships among multiple components that, in the aggregate, determines the state of some feature or aspect of the system. These can be indicated by (among other ways) using a single headed arrow to show the physical and/or functional components that drive the computation of the state of each functional component. In this, arrow heads connect to the functional component, and arrow tails connect to those physical components whose state drive the computation.

With the physical and functional components defined, and the dependency and state relationships defined, the next step 612 is to specify component output functions and annunciation functions for the physical and functional components. This would typically involve using standardized operators such as weighted summing of the inputs and conditional output generation computed as a function of the inputs. The component output function generates an output that is used downstream to any dependent components that are connected by arrows. The annunciation output function likewise determines if the associated annunciation should be asserted or not.

With the model created, the last step 614 is to validate the system representation. This would typically involve determining the correctness of the representation by manually failing individual (and groups of) components and then verifying that the intended annunciations are generated. This would typically be iteratively performed until one is reasonably confident that all failures generate the desired annunciation outputs. Since it may be virtually impossible to verify all components when considered in higher-order combination, one may resort to statistical methods to gain confidence in the sampling performed.

Figure 7:
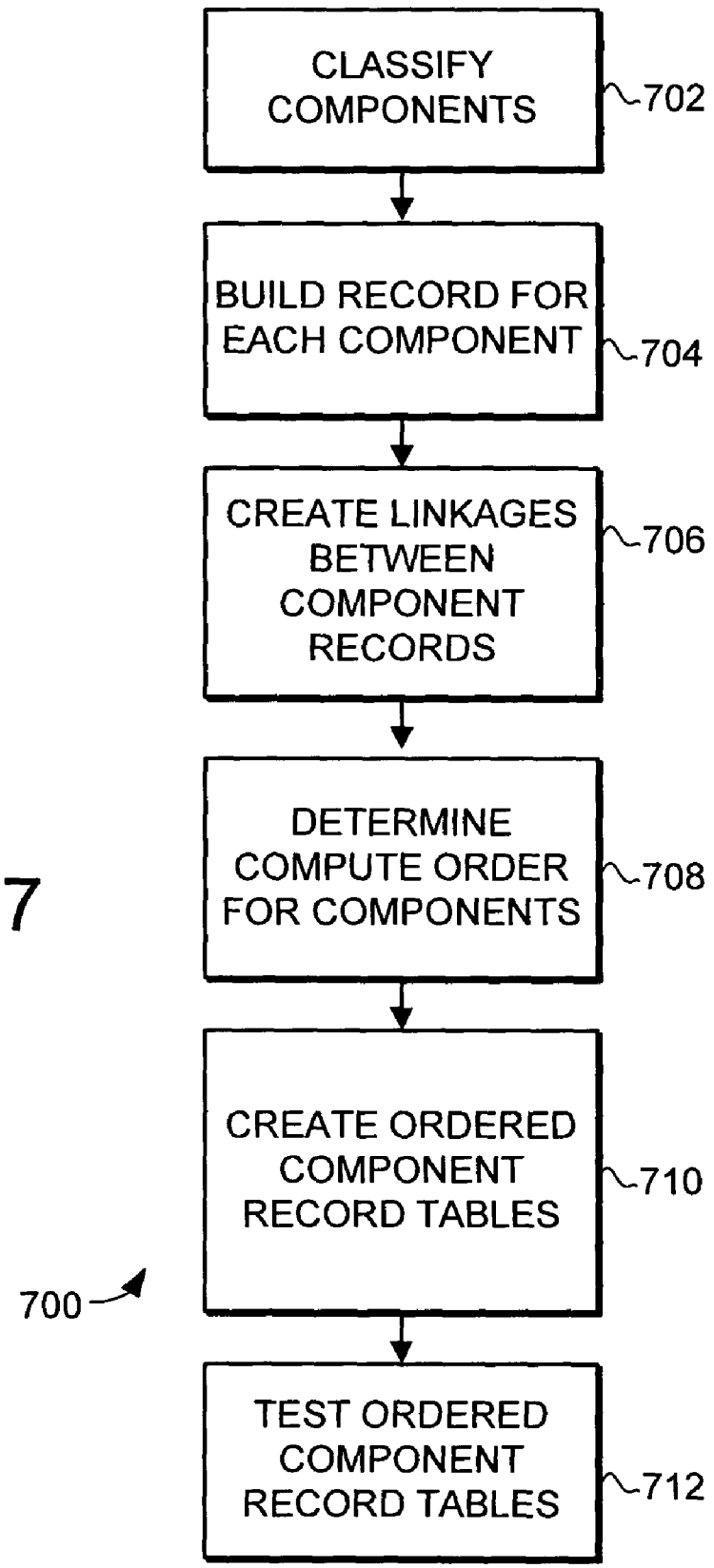
FIG. 7 is a flow diagram illustrating a method for creating component dependency model from a system representation.

Turning now to FIG. 7, a method 700 for creating component dependency model from a system representation is illustrated. Method 700 creates the physical component records and functional component records of the component dependency model by analyzing the data in the system representation. Furthermore, the method creates ordered component record tables that can be used for real time impact assessment.

Method 700 can be implemented with a computer model generating tool that automates the process of creating a component dependency model from the system representation. As one example, the method 700 can be implemented as a macro-program that runs on the graphical drafting tool used to create the system representation. For example, a Visual Basic macro running on Microsoft Visio can process a Visio-based graphic system representation and create the needed component dependency model. In overview, this can done by writing a macro or other program that can "see" the objects drawn in the drawing canvas. Such a program analyses all the drawn figures, infers their linkages and interactions based on drawn connections, and creates arrays of data based on what it finds. Using those arrays, it further analyzes the model content, checking for internal consistency and completeness. When validated as structurally correct, the content is analyzed and algorithmically transformed into a set of data tables which, when fed with real-time or manually-inserted failure information, performs the actual impact analysis calculations that computes and reports emergent criticality. With this overview, the algorithmic steps are described below.

The first step 702 is to classify the components in the system representation (drawing). This can be accomplished by programmatically walking through the components in the representation, identifying each component found and classifying it by type (e.g., function component, physical component, dependency arrow, stat arrow, annunciation, or comment).

With the components identified, the next step 704 is to build a record for each component. The record can comprise a text file or other data structure that includes the parameters of the component, such as input weights, component output function and component annunciation functions. As one example, an independent array of records is created for the components.

The next step 706 is to create linkages between component records. This would typically involve determining for each component the dependency and state relationships to other components, and creating a linkage in the corresponding report. Thus, for every arrow pointing to a component on the drawing, the component from which that arrow originates is entered as an input to the record for the component that is pointed to by the arrow.

As part of this process a full validation of the components and linkages can be performed to insure that all required data is present, and that all relationships between components logical and include no improper dependency loops. Additionally, it can be validated that all output functions and annunciation functions are fully computable.

Steps 704 and 706 thus create component records that include all the necessary parameters for all the components in the complex system. The physical component records and functional component records, along with their associated parameters, defines the component dependency model. As will be described in greater detail below, this model can be used as a design tool used for impact assessment.

Additionally, the component dependency model can be used in real time by creating ordered component records that can be used in a real time impact assessment system. The next step 708 is thus to determine the compute order for the components. This would typically involve inferring an order for the computation that is free of forward references or loop-causing elements. This can be done in the following manner. Start by creating a "master list" that contains all components in no particular order. On the first iteration, select those components from the master list that have no inputs. For the selected components, store them to the "computation order list" and remove them from the master list. For the second and subsequent iterations, find all those components on the master list which meet the criteria that all of their inputs are have already been removed and put to the computation order list. For all those identified, remove them from the master list and put them on the computation order list. Repeat this process until the master list is empty and the computation order list contains all the entries. The result of this process is that the computation order list includes the components in an order which guarantees that no component has its status computed until after all of its upstream inputs have had their status computed first.

The next step 710 is to create ordered component record tables. Essentially this involves taking the physical component records and functional component records and forming linked data tables in the order determined in step 708. Thus, the result is a set of component records in the correct order that be easily processed in a real time impact assessment system.

In addition to creating ordered component record tables for real time use, additional record databases can be created for testing and training of the system. For example, a training database can be created using a spreadsheet program such as Microsoft Excel. For each component in the records, a multi-column row in the spreadsheet file is created with all the record data associated with that component. In this spreadsheet case, it is not necessary to provide in an ordered manner, as the spreadsheet is well equipped to deal with unordered data in a computationally sound (although non-real time) way. In this file, the impact assessment processing would be performed by the spreadsheet program which evaluates the contents of all cells. The contents of all cells are filled with mathematical expressions (put there by the model analyzer) which duplicate the computations that the real-time impact assessment software would do in the real-time environment. The advantage of the spreadsheet is that it is familiar and simple for all users to use as a part of a typical system training regimen. No special knowledge of the use of the modeling tools is required to enjoy the benefit of a system model that teaches the user how the complex system behaves (in response to manually input failures). In actual usage, the spreadsheet would preferably include a column that allows a user of the spread sheet to manually identify a corresponding component as failed. Another column generated by the spreadsheet identifies the direct downstream failures. Yet another column shows all annunciations that will be generated. Note that this spreadsheet method does NOT show "emergence" of criticality, as it represents a static snapshot of the system at a particular moment in time.

The result of such a process is a spreadsheet that can function as an impact assessment system. Users can manually insert failures using the appropriate column in the spread sheet. The spreadsheet is then run, and the spreadsheet would generate the output functions and annunciations that would result from the manually inserted failures. Thus, the spreadsheet can be used as a training tool to teach users of the system how it will behave in response to component failures.

The next step 712 is to test the ordered component record tables. This can be doing using several techniques. For example, it can be done using the spreadsheet files described above. Another technique would be do manually enter failures directly into the model itself, and evaluate the effects of the manually entered failures by calculating the impact of those failures. This would essentially comprise performing method 400 manually on the component records and comparing the results to predicted results.

Thus, method 700 is able to receive a system representation of a complex system and from that representation create a component dependency model that can be used for impact assessment. Additionally, the method 700 can create the model in the form of ordered component records that facilitate real-time impact assessment. Finally, method 700 can be used to generate training data structures such as spreadsheets that mimic the behavior of the impact assessment system for use in training and other testing.

Figure 8:
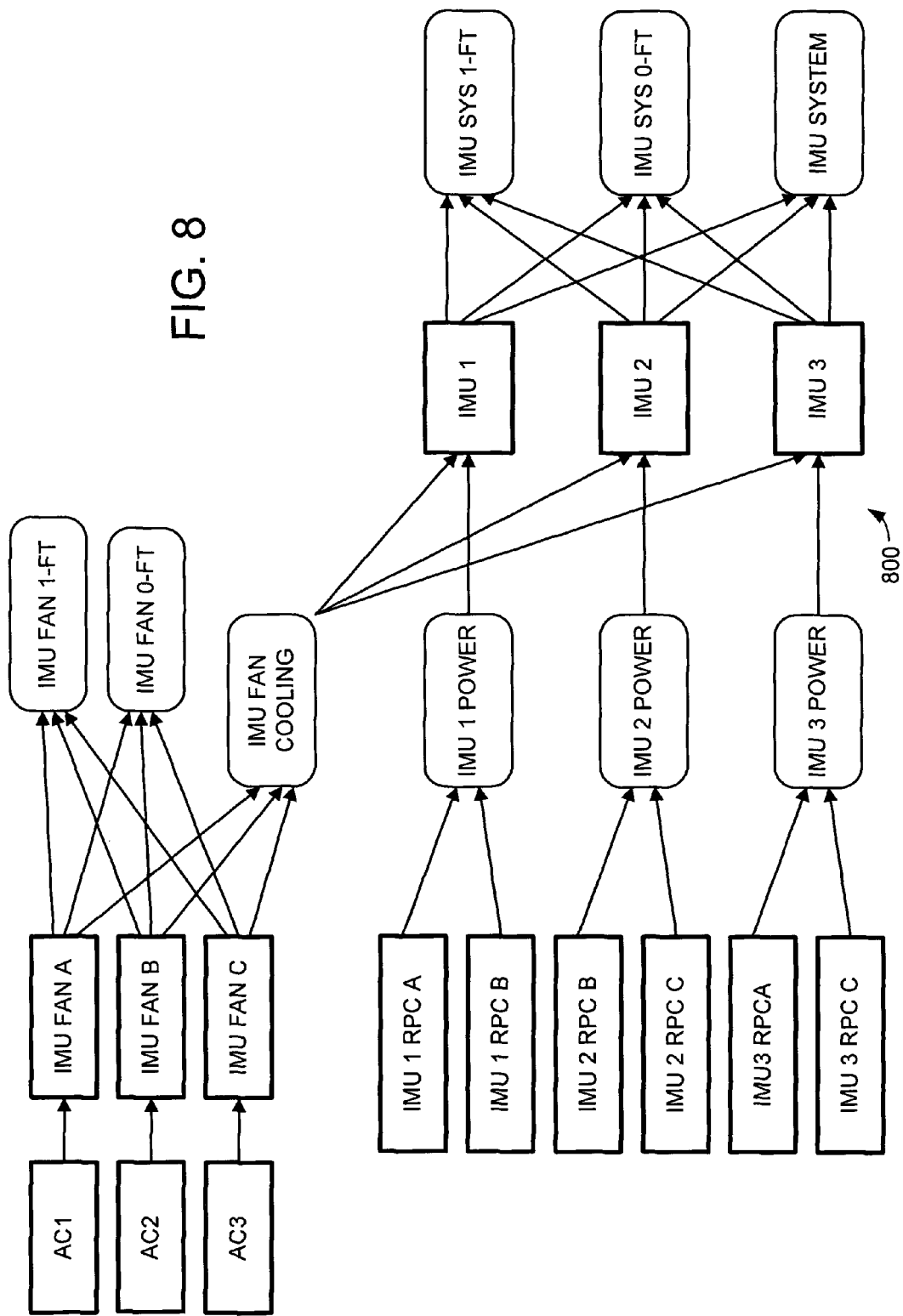
FIG. 8 is a schematic view of an exemplary system representation.

Turning now to FIG. 8, an exemplary system representation 800 is illustrated. It should be noted that the system representation 800 is a representation of a relatively simple system, and that typical complex systems could have many more physical and function components. The representation 800 is a graphical representation, and could be created using a variety of graphical tools, such as Microsoft Visio. The representation 800 could be used to create a component dependency model, which would then be used to determine the impact of component failures in the system.

The exemplary representation 800 includes a plurality of elements representing physical components, and a plurality of elements representing functional components, and a plurality of linkages between the various components. In the illustrated example, physical components are illustrated with square boxes, while functional components are illustrated with rounded boxes. Dependency relationships and state relationships between components are illustrated with arrows from component to component.

The representation 800 includes physical components for the Inertial Management Unit (IMU) system and its associated cooling and power systems. The cooling system consists of fans and small power supplies for those fans (AC units). The power system consists of a series of 3 pairs of dual-redundant, cross-bridged Remote Power Controllers (RPCs), each of which is fed by one of 3 fuel cells (not shown) designated Fuels Cell A, B and C. Hence IMU 2 RPC B passes power from Fuel Cell B to IMU 2. Should it or Fuel Cell B fail, its partner IMU 2 RPC C will also be able to power IMU 2, but this time taking power from Fuel Cell C. The representation also includes functional components for IMU fans, IMU power, and the IMU system itself.

To give an example of how the representation works, there are three IMU fans (A, B and C) that can provide cooling to the IMUs. If all three fans are operable, the IMU fan system is double fault tolerant. If one fan fails, the IMU fan system becomes single fault tolerant, and if two fans fail the system looses fault tolerance. Finally, if all three fans fail, the IMU fan system fails.

To model these potential operational states of the fan system, the system representation 800 includes three functional components related to the IMU fan system. Each of these functional components is used to model and annunciate the operational state of the fan system, and thus each functional component has a state relationship that depends from the three fans.

Specifically, if any one fan fails, the fan system would become single fault tolerant and the IMU FAN 1-FT component would provide an appropriate annunciation to alert system users of the change in criticality. Likewise, the IMU FAN 0-FT component would provide an appropriate annunciation if any two fans fail and the system looses all fault tolerance.

Finally, if all three fans fail, the IMU fan functional component would provide an appropriate annunciation alerting of full cooling system failure. Furthermore, because a failure in all three fans would necessarily effect the operation of the IMUs themselves, the IMU fan component is linked in a dependency relationship to the IMU physical components themselves. In the event of a failure of all three fans, the output function of the IMU fan functional component would produce an output that is passed to the IMU components. Thus, the effect of a failure in the fans is propagated to the dependent components, and, in this case, the inevitable resulting failure in the IMUs themselves is recognized and annunciated. Furthermore, even if only two of the fans are failed and the IMU system is still able to function, flight rules will dictate that the mission must end at the earliest opportunity, and this annunciation would also be made by the Impact Assessment system.

Similarly, the representation 800 illustrates how the IMUs are also dependent upon power supplies, and how the IMUs can have different levels of fault tolerance.

The system representation 800 can be used to create a component dependency model, which is then used for impact assessment. This would involve performing method 800 on the system representation. The result would a component dependency model that includes records for the physical and function components in the system.

Figure 9:
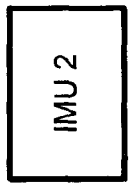
FIG. 9 is a schematic view of an exemplary component record.

Turning to FIG. 9, an example physical component record 900 for IMU 2 is illustrated. The physical component record 900 for the IMU 2 includes a compute order identifying the location in compute order that this component record resides at. It includes listings of the three inputs (IMU cooling, IMU 2 Power, and FF2 MDM (not illustrated in FIG. 8 for clarity). These correspond to the upstream components of the IMU 2 as shown in the representation 800. The record 900 also includes three weights, one for each input that indicate the weight that should be given to each input in calculating the output function. The record 900 also includes an identification of the output function as being the IN_RANGE function, and identifies two output parameters used in this calculation. The record 900 also includes an identification of the annunciation function as being IN_RANGE, and the identification of two annunciation parameters. The record 900 also lists the annunciation importance that is used for ordering the output such that highest priority annunciations are shown to the crew and operational staff first and the actual text of the annunciation "report" given when the annunciation function is triggered. Finally, the record 900 includes listing of telemetry data used for those cases where real-time operational data must be fetched from the system, i.e. for acquisition of MODE information. This field includes the symbol with which the real-time data value is acquired. The accompanying field TELEMETRY_ENUM_GOOD describes the status value that would indicate that good MODE data was retrieved.

Specifically, the example in record 900 lists the input weights as all 1, thus the three inputs will be summed with equal weights. The sum of the three inputs may thus be within the range of 0 to 3. The Output Function is specified as IN_RANGE with OUTPUT PARAMs 3 and 3. IN_RANGE with PARAMs 3 and 3 means that if the weighted sum of the three inputs is between 3 and 3 (or in other words, equal to 3) then the OUTPUT for this function will be 1, and 0 otherwise. Similarly, the annunciation function is defined to be IN_RANGE but with ANNUNCIATOR PARAMs of 0 and 0. This means that if the value of the components OUTPUT is with the range of 0 to 0 then the annunciation will be asserted, otherwise not.

Turning now to FIG. 10, an exemplary status report 1000 is illustrated. Status report 1000 is exemplary of the type of output that can be provided by the impact assessment system and method. The status report describes emergent criticality. Specifically, the status report 1000 includes three parts. The first part includes a listing of the actual failed components and operational mode values. These define the base case for the analysis. In this example, the 2 failed components are FUEL CELL #1 and CNT AB2, and the operational mode is 1. The second part is a priority-ordered list of direct effects, i.e., things which are now failed, including both physical (reported as "equipment") and functional (reported as "functionality") components. The third part of report 1000 is an "extract" of a larger list showing that zero fault tolerance in the IMU system (IMU SYSTEM 0-FT) can now be caused by things that previously would not have caused it. These new potential causes of zero fault tolerance are single failures of FUEL CELL #3, GPC2, GPC3, etc. In addition, some new double failures have emerged as new potential causes of zero failure tolerance in the IMU system. These are concurrent failures of FUEL CELL #2 and either CNT BC1 or IMU 2 RPC C, also MN B DA2 and either CNT BC1 or IMU2 RPC C, to name just a few. These are all examples of emergent criticality that crew and operational staff need to be informed of.

Figure 12:
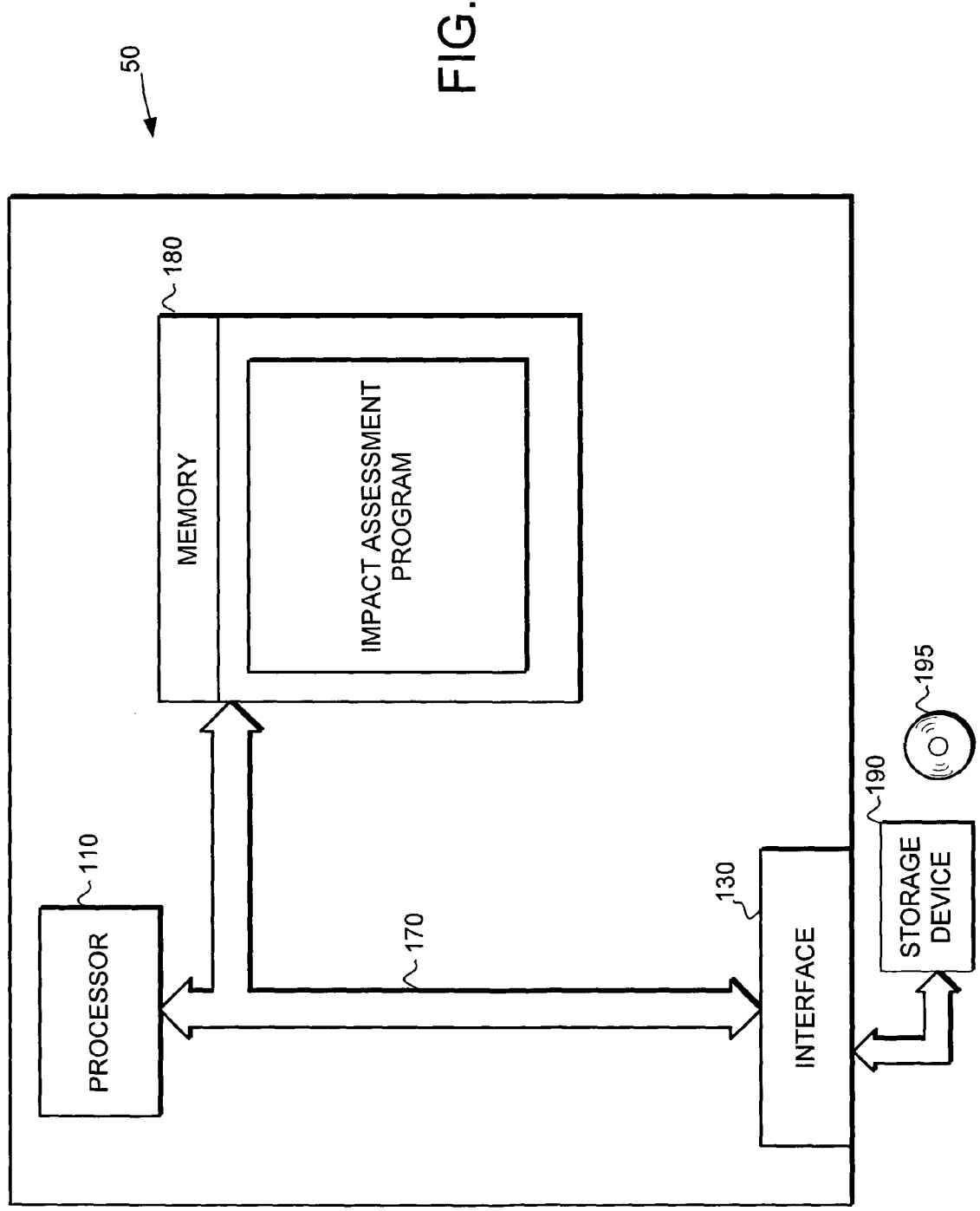
FIG. 12 is schematic view of an exemplary computer system implementing an impact assessment system.

The impact assessment system and method can be implemented in wide variety of platforms. Turning now to FIG. 12, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as onboard an aircraft or other complex vehicles to provide onboard diagnostics, or on the ground to provide remote diagnostics. The exemplary computer system 50 includes a processor 110, an interface 130, a storage device 190, a bus 170 and a memory 180. In accordance with the preferred embodiments of the invention, the memory system 50 includes an impact assessment program, which includes a component dependency model and an emerging criticality analyzer.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. In addition, the processor 110 may be part of an overall vehicle control, navigation, avionics, communication or diagnostic system. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50. For example, a portion of memory 180 may reside on the vehicle system computer, and another portion may reside on a ground based diagnostic computer.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 12, storage device 190 can comprise a disc drive device that uses discs 195 to store data.

In accordance with the preferred embodiments of the invention, the computer system 50 includes an impact assessment program. Specifically during operation, the impact assessment program is stored in memory 180 and executed by processor 110. When being executed by the processor 110, the impact assessment program receives failure data and determines the impact of the failure on emerging criticalities.

As one example implementation, the impact assessment system can operate on data that is acquired from the mechanical system (e.g., aircraft or other vehicle) and periodically uploaded to an internet website. The analysis is performed by the web site and the results are returned back to the technician or other user. Thus, the system can be implemented as part of a web-based diagnostic and prognostic system.

As another example, the impact assessment system can operate on board the vehicle, as part of the on-board diagnostic system. In this case the failure data is stored and processed on board to provide a warning when failures cause emerging criticalities.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The present invention thus provides an impact assessment system and method for determining emerging criticality in a complex system. The impact assessment system includes a component dependency model and an emergent criticality analyzer. The component dependency model describes the relationships between components in the system and their underlying dependency and criticality relationships. The impact assessment system receives component failure data from the complex system and uses the component dependency model and emergent criticality analyzer to determine the impact of the component failure on the criticality of remaining components in the system. The impact assessment system is thus able to determine how component failures in the complex system can impact the criticality of remaining components in the complex system and thus can assist in determining how those components may or may not be safely used in further operational activities. In addition, these impacts can be passed to a status reporting system where they can be made available for further analysis.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An impact assessment system for determining an impact of component failure in a complex system, the impact assessment system comprising:
 a processor;
 a memory coupled to the processor, the memory including an impact assessment program configured to be executed by the processor, the impact assessment program comprising:
  a component dependency model, the component dependency model describing dependency relationships between components in the complex system; and
  an emergent criticality analyzer, the emergent criticality analyzer configured to calculate base annunciations for previous component failures, single additional failure annunciations for the previous component failures, and double additional failure annunciations for the previous component failures, the emergent criticality analyzer further configured to receive failure data for the complex system, the failure data indicating a new component failure in the complex system, the emergent criticality analyzer further configured to determine changes in redundancy status of remaining components in the complex system to determine the impact of the new component failure on criticality of the remaining components in the complex system, and wherein the emergent criticality analyzer determines changes in the redundancy status of the remaining components in the complex system by computing base case annunciations for the new component failure, single additional failure annunciations for the new component failure, and double additional failure annunciations for the new component failure, and subtracting the base annunciations for previous component failures, the single additional failure annunciations for the previous component failures, and the double additional failure annunciations for the previous component failures.

2. The system of claim 1 wherein the emergent criticality analyzer produces annunciations describing the impact of the component failure on criticality of remaining components in the complex system and passes the annunciations to an operator of the complex system.

3. The system of claim 1 wherein the emergent criticality analyzer determines changes in redundancy status of remaining components in the complex system by computing an component output function for each component in the component dependency model in a specified order, the component output function producing an output that is propagated to downstream components.

4. The system of claim 3 wherein the emergent criticality analyzer further computes an annunciation function for each component in the component dependency model in a specified order, the annunciation function producing an output that determines if a corresponding annunciation is asserted.

5. The system of claim 1 wherein the component dependency model describes dependency relationships between components in the complex system by including a plurality of physical component records and a plurality of functional component records, each of the physical component records corresponding to a physical equipment in the complex system and each of the functional component records corresponding to a functional state in the complex system.

6. The system of claim 5 wherein the plurality of physical component records and the plurality of functional component records each includes a plurality of input designations, a plurality of input weights, a component output function and an annunciation output function.

7. The system of claim 1 wherein the component dependency model is generated from a graphical representation of components in the complex system.

8. The system of claim 1 wherein the component dependency model is generated from a graphical representation of components in the complex system using a programmatic analysis of the graphic representation.

9. The system of claim 8 wherein the programmatic analysis of the graphic representation determines a processing order of components in the complex system.

10. The system of claim 1 wherein the impact assessment system is implemented as part of a vehicle health management system and wherein the impact assessment system receives failure data and determines the impact of the component failure on criticality of remaining components in real time.

11. The system of claim 1 wherein the impact assessment system is implemented as part of a design tool and is used to evaluate effects of component failures during a design process.

12. The system of claim 1 wherein complex system comprises a vehicle system.

13. A non-transitory computer readable medium embodying a computer program product, the program product comprising:
an impact assessment program for determining an impact of component failure in a complex system, the impact assessment program including:
a component dependency model, the component dependency model describing dependency relationships between components in the complex system;
an emergent criticality analyzer, the emergent criticality analyzer configured to calculate base annunciations for previous component failures, single additional failure annunciations for the previous component failures, and double additional failure annunciations for the previous component failures, the emergent criticality analyzer further configured to receive failure data for the complex system, the failure data indicating a new component failure in the complex system, the emergent criticality analyzer determining changes in redundancy status of remaining components in the complex system to determine the impact of the new component failure on criticality of the remaining components in the complex system, and wherein the emergent criticality analyzer determines changes in the redundancy status of the remaining components in the complex system by computing base case annunciations for the new component failure, single additional failure annunciations for the new component failure, and double additional failure annunciations for the new component failure, and subtracting the base annunciations for previous component failures, the single additional failure annunciations for the previous component failures, and the double additional failure annunciations for the previous component failures.

14. The program product of claim 13 wherein the emergent criticality analyzer produces annunciations describing the impact of the component failure on criticality of remaining components in the complex system and passes the annunciations to an operator of the complex system.

15. The program product of claim 13 wherein the emergent criticality analyzer determines changes in redundancy status of remaining components in the complex system by computing a component output function for each component in the component dependency model in a specified order, the component output function producing an output that is propagated to downstream components.

16. The program product of claim 15 wherein the emergent criticality analyzer further computes an annunciation function for each component in the component dependency model in a specified order, the annunciation function producing an output that determines if a corresponding annunciation is asserted.

17. The program product of claim 13 wherein the component dependency model describes dependency relationships between components in the complex system by including a plurality of physical component records and a plurality of functional component records, each of the physical component records corresponding to a physical equipment component in the complex system and each of the functional component records corresponding to a functional state in the complex system.

18. The program product of claim 17 wherein the plurality of physical component records and the plurality of functional component records each includes a plurality of input designations, a plurality of input weights, a component output function and an annunciation output function.

19. The program product of claim 13 wherein the component dependency model is generated from a graphical representation of components in the complex system.

20. The program product of claim 13 wherein the component dependency model is generated from a graphical representation of components in the complex system using a programmatic analysis of the graphic representation.

21. The program product of claim 20 wherein the programmatic analysis of the graphic representation determines an processing order of components in the complex system.

22. The program product of claim 13 wherein the impact assessment system is implemented as part of a vehicle health management system and wherein the impact assessment system receives failure data and determines the impact of the component failure on criticality of remaining components in real time.

23. The program product of claim 13 wherein the impact assessment system is implemented as part of a design tool and is used to evaluate effects of component failures during a design process.

24. The program product of claim 13 wherein complex system comprises a vehicle system.

* * * * *